(12) United States Patent
Mahendran et al.

(10) Patent No.: US 6,354,444 B1
(45) Date of Patent: *Mar. 12, 2002

(54) HOLLOW FIBER MEMBRANE AND BRAIDED TUBULAR SUPPORT THEREFOR

(75) Inventors: Mailvaganam Mahendran, Hamilton (CA); Kenneth Paul Goodboy, Wexford, PA (US); Luigi Fabbricino, Burlington (CA)

(73) Assignee: Zenon Environmental Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/335,073

(22) Filed: Jun. 17, 1999

Related U.S. Application Data

(63) Continuation-in-part of application No. 08/886,652, filed on Jul. 1, 1997, now Pat. No. 5,914,039.
(51) Int. Cl.[7] .......................... B01D 39/00; B01D 61/18
(52) U.S. Cl. ............. 210/490; 210/500.23; 210/500.25; 210/500.42
(58) Field of Search ........................... 428/36.3; 87/9; 210/490, 497.1, 500.27, 500.23, 500.42, 500.25; 55/520, 527

(56) References Cited

U.S. PATENT DOCUMENTS

| | | | | |
|---|---|---|---|---|
| 3,676,193 A | * | 7/1972 | Cooper et al. |
| 3,948,781 A | * | 4/1976 | Brun et al. |
| 4,061,821 A | | 12/1977 | Hayano et al. |
| 5,240,610 A | * | 8/1993 | Tani et al. |
| 5,472,607 A | | 12/1995 | Mahendran et al. |
| 5,914,039 A | * | 6/1999 | Mahendran et al. |

\* cited by examiner

*Primary Examiner*—Ana Fortuna
*Assistant Examiner*—Richard W. Ward
(74) *Attorney, Agent, or Firm*—Alfred D. Lobo

(57) ABSTRACT

An asymmetric membrane comprising a tubular polymer film in combination with a tubular braid on which the film is supported, requires the braid be macroporous and flexible, yet sufficiently strong to withstand continuous flexing, stretching and abrasion during use for microfiltration (MF) or ultrafiltration (UF). The specifications for a braid of a long-lived membrane are provided. A membrane is formed by supporting a polymer film in which particles of calcined α-alumina are dispersed, on the defined tubular braid.

11 Claims, 4 Drawing Sheets

US 6,354,444 B1

HOLLOW FIBER MEMBRANE AND BRAIDED TUBULAR SUPPORT THEREFOR

CROSS-REFERENCE TO RELATED APPLICATION

This application is a continuation-in-part of application Ser. No. 08/886,652 filed Jul. 1, 1997 now U.S. Pat. No. 5,914,039.

FIELD OF THE INVENTION

This invention relates to a braided tubular support for a film of polymer which functions as an asymmetric semipermeable membrane in microfiltration (MF) and ultrafiltration (UF) applications. The braided tube is no more than about 3 mm in outside diameter and relies on the polymer film to imbue the fiber membrane product with sustainable high flux along with sufficient abrasion resistance such that a skein of fibers (also referred to as a "module") can operate in a commercial filtration application for several months without the formation of pin-holes.

BACKGROUND OF THE INVENTION

U.S. Pat. No. 5,472,607 to Mailvaganam Mahendran et al discloses a hollow fiber semipermeable membrane in which a tubular macroporous support is superficially coated on its outer surface with a thin film of polymer, most preferably of polyvinylidene difluoride. The tubular braid is flaccid but other details of the structure of the braid are not specified. For example, the effect of characteristics of the material forming the braid were not known; nor was the effect of a cross-section which was not truly circular, i.e. having "cylindricity" substantially less than 1.0. The term "cylindricity" (sometimes referred to as "roundness") refers to how perfectly the circular cross-section of the tubular support matches the geometry of a true circle drawn to correspond to the mean diameter of the braid, a perfect match being 1.0. It was therefore not known at that time, how critical the physical characteristics of a preferred braid were to the performance of a hollow fiber membrane using the braid.

In commercially available braid, made with conventional braiding equipment from commercially available yarn, there were numerous "breaks" in the fiber; also, accumulation of clumps of broken filaments, referred to as "fuzz", braided into the cylindrical wall of the braid, resulted in weak spots in the polymer film coated onto the surface; and broken filaments, referred to as "whiskers", protruding from the surface of the tubular braid, resulted in too-thick domains of polymer which were concentrated around the whiskers; and, when the domain was not too-thick, whiskers have a proclivity to initiate pin-holes.

Further, if the open weave of the braid provided either too high or too low a braid porosity as measured by resistance to air flow, the fiber membrane formed was unusable in a commercial installation. Too open a weave resulted in the braid being embedded, that is, enclosed by and firmly fixed in the polymer which also infiltrates into the bore of the braid; thus, too open a weave results in greatly reduced permeability. Too tight a weave results in the polymer not being anchored sufficiently well on the surface; this increases the likelihood that, in service, the polymer film will be peeled from the braid. When operating flux was excellent, portions of the polymer film were sometimes found to have been peeled away when the fibers were backwashed with clean water or other fluid medium, whether water or permeate, under pressure; or portions of the film were "blown off" the surface of the fibers when their lumens were pulsed with air under pressure. Even with the best braid produced under controlled conditions, shrinkage during usage in an aqueous medium varied unpredictably. This resulted in taut fibers which were prematurely fouled because they were unable to move sufficiently to stay clean or rub against each other. If too taut, the fibers are broken before they are fouled, or torn from potting resin in the header. Particularly because it is essential for best performance, and to shed contaminants from the surfaces of the hollow fiber membranes, that a skein of fibers operate with "slack" fibers, the structure of the braid needs to survive repetitive twisting, and it was not known what physical characteristic(s) of the braid was conducive to such survival. A cylindricity less than 0.8 resulted in a polymer film with unacceptable variations in thickness resulting in non-uniform flux and zones which were too easily fouled.

The goal to achieve great strength led one to choose a high strength yarn, e.g. of glass, aramid or other high modulus material, to benefit from its high strength and stability. For example, a braid woven from glass multifilaments, has insignificant maximum extension at break, less than about 5%, and is essentially non-shrinkable. However, in practice, braided fibers woven with such stable high modulus yarns are not desirable as they provide inadequate adherence of film to the surface of the braid, attributed to the negligible moisture regain of such fibers, and when wet, the braid is too fragile for prolonged service. In particular, it was not known that a certain range of moisture regain in the material of the braid was essential for optimum operation of hollow fiber membranes coated with a hydrophilic polymer film and operated in an aqueous or alcoholic environment. The moisture regain is the percentage of moisture in a textile material brought into equilibrium with a standard atmosphere after partial drying, calculated as a percentage of the moisture-free weight.

The goal to anchor the polymer film non-removably, and to achieve a high "bubble point" in a membrane with no defects (such as pin-holes) was not identified in the '607 disclosure because the factors which affected the goal were not known. The "bubble point" refers to the pressure under which a stream of air escapes through the largest pore in a wall of a defect-free membrane which has desirable flux. Further, the importance of stability of the structure of the braid during operation, particularly the effect of shrinkage, was not known.

SUMMARY OF THE INVENTION

It has been discovered that certain physical characteristics of a tubular braid are critical to the formation of a desirable hollow fiber MF or UF, that is, liquid-separation membrane which is stable and strong, yet has an essentially trouble-free useful life and an acceptable, desirably high, permeability.

It is therefore a general object of this invention to provide a tubular braid support for an asymmetric membrane, woven from yarn made with synthetic resinous filaments essentially insoluble in the solvent in which the membrane-forming polymer is dissolved, the braid having a stable heat-pre-shrunk length which is in the range from about 1% to 20% less than its unshrunk length, preferably so that, irrespective of the material forming the fibers, when the pre-shrunk braid is stretched longitudinally, it has "give", that is, the extension at break is at least 10%, preferably in the range from 10% to 30%, and more preferably about 20%.

It is a specific object of this invention to provide a heat-pre-shrunk tubular braid made with specified patterns, using carriers carrying yarn having defined number of filaments, ends, denier, and picks, under conditions which control the porosity (measured as permeability to air) of the braid, such controlled porosity serving to anchor a polymer film non-removably on the surface of the tubular braid.

It is another specific object of this invention to provide, in a flexible macroporous tubular braid support for an outside-in hollow fiber asymmetric membrane having a tubular film of synthetic resinous material supported on the outer circumferential surface of the braid without the support being embedded in a thin film having a wall thickness of less than 0.2 mm, the improvement comprising, 16 to 60 separate yarns, each on its own carrier, each yarn being multifilament 150 to 500 denier (g/9000 meters) yarn, each multifilament being made with from 25 to 750 filaments, each filament being from 0.5 to 7 denier. From 1 to 3 multifilament ends constitute a yarn, and the individual ends are most preferably not plied together, but lie linearly adjacent to each other until taken up in the "fell" of the braid being woven. The braid being woven has from 30 to 45 picks (crosses/inch). The higher the denier of the filaments, the fewer the filaments used, but the braid wall thickness is maintained in the range from about 0.2 mm but less than three times the diameter of the yarn from which the braid is woven, preferably less than 1.0 mm. The air permeability of the braid of synthetic resinous yarn is in the range from about 1 to 10 cc/sec/cm$^2$ at a differential pressure of 1.378 kPa (0.2 psi); and the moisture regain is in the range from about 0.2% to 7% by weight (wt). The finished fiber membrane is coated with a thin polymer film having a thickness in the range from 0.05 mm to 0.3 mm, most preferably less than 0.1 mm thick. The film has an annular peripheral barrier layer or "skin" circumferentially integral with successive microporous layers in the film, each layer contiguous with a preceding layer, the layers including an outer annular layer, an intermediate transport layer, and an annular inner layer.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1A:
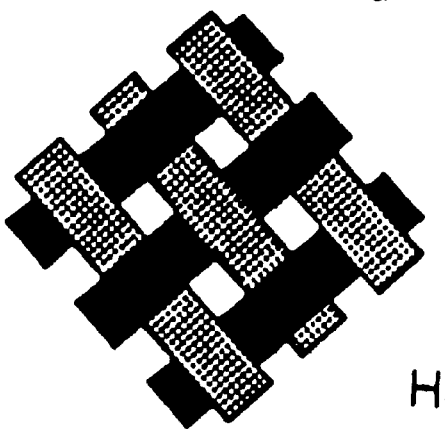
FIG. 1A schematically illustrates a "diamond" pattern in a tubular braid.

Details of a hollow fiber membrane are presented in the aforementioned '607 patent and 08/886,652, U.S. application Ser. No. the disclosure of each of which is incorporated by reference thereto as if fully set forth herein. A preferred tubular braid is woven with yarn, the denier of which is chosen with consideration of the outside diameter of the braid on which the polymer film is to be coated, and whether the membrane is to be used for MF or UF. A desirable air-permeability for a UF membrane to provide drinking water, is in the range from about 5 to 25 LMH/kPa (liters/m$^2$/kPa/hr) or 20 to 100 GFD/psi (gals/ft$^2$/day/psi), preferably from about 7.4 to 18.5 LMH/kPa (30 to 75 GFD/psi), measured with RO (reverse osmosis) water; a desirable permeability for a MF membrane used to filter municipal sewage and provide clean water is in the range from 10 to 50 LMH/kPa (40 to 200 GFD/psi), typically about 12.5 to 25 LMH/kPa (50 to 100 GFD/kPa), measured with RO water. A typical defect-free fiber has a bubble point in the range from about 140 to 280 kPa (20 to 40 psi). For a UF membrane it is desirable to have a bubble point in the range from 13 to 40 kPa (2 to 6 psi), preferably about 35 kPa (5 psi) to emphasize the importance of a defect in a fiber; for a MF membrane it is desirable to have a bubble point in the range from 6 to 20kPa (1 to 3 psi), preferably about 13 kPa (2 psi), for the same reason.

The structure of the tubular braid is determined by the machine used to weave the braid which is formed of intertwined, spiral yarns so that its thickness is less than three yarn diameters, and the yarn orientation is helical. The braided tube may be woven on either vertical or horizontal tubular braiding machines, the former being preferred. A machine includes a track plate provided with intertwining tracks, plural tube or bobbin carriers for the yarn capable of moving counterclockwise or clockwise along the tracks for braiding, a former and a take-up device. Bobbins are flanged tubes used for yarns which are difficult to handle. Yarns from bobbins mounted on the bobbin carriers are braided as they are guided to a gathering guide disposed above the center of the disk. Each bobbin carrier is rotated by a drive gear disposed under the track plate while it moves along the tracks. The ratio between the moving speed of the bobbin carriers and the braid drawing speed can be changed by changing the gear ratio, so that the braids may differ from each other in the angle of the strands. Different interlacings, or weave patterns, can be achieved by controlling the motion of the yarn carriers. By controlling the take-up rate, the angle of the braid can be controlled. It is essential that the yarn tension be controlled to provide uniform tension so as to form a uniform braid. Machines for making the tubular braid and the method of making it are well known and form no part of the invention. If desired, axial reinforcements may be provided by using a third system of yarns which can be inserted between the braiding yarns to produce a triaxial braid. Such reinforcement is typically found unnecessary.

A typical tubular braid is made from two sets of yarns or ends which are intertwined. Preferred materials are polyesters and nylons in yarn which is most preferably in the range from about 200 to 400 denier (g/9000 meters), with from 40 to 100 filaments having a denier in the range from about 3 to 6. The braid is preferably woven with from 16 to 28 carriers with from about 36 to 44 picks (crosses/inch) to have an outside diameter in the range from about 1.5 mm to 2.5 mm and a wall thickness in the range from about 0.15 mm to about 0.50 mm, most preferably about 0.3 mm.

Figure 1B:
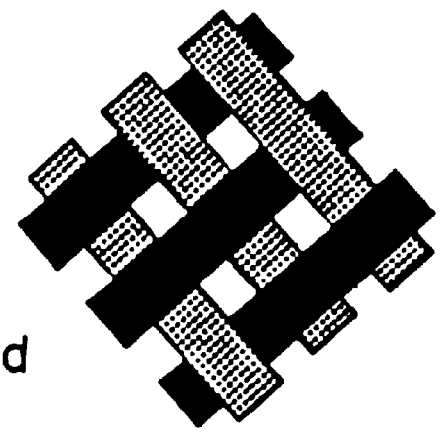
FIG. 1B schematically illustrates a "regular" pattern in a tubular braid.
Figure 1C:
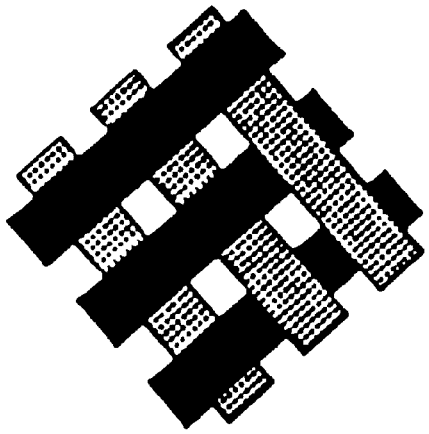
FIG. 1C schematically illustrates a "Hercules" pattern in a tubular braid.

The pattern in which the braid is woven is not narrowly critical provided the porosity is maintained within chosen limits, and though a "Regular" or "Hercules" braid is usable, a "Diamond" pattern is most preferred. Referring to FIG. 1A, there is schematically illustrated a diamond braid having an alternation of one yarn passing above and then below the other yarns (1/1). FIG. 1B illustrates the regular braid passes above two and below two in a repeat (2/2). FIG. 1C illustrates the Hercules braid which has a structure of 3 up, 3 down (3/3).

The load at break of a preferred heat-shrunk braid is at least 50 lb-force, preferably from 444 to 888 Newtons (100 to 200 lb-force), recognizing that the heat-pre-shrunk synthetic resinous braid has a stable length which is in the range from 1% to 16% less than its unshrunk length.

The critical importance of providing a stable heat preshrunk length is because the outer surfaces of taut fibers in a skein (taut because of shrinkage during use) become so fouled that they are ineffective to filter. Further, stresses on taut fiber membranes stress not only the tubular braid but the overlying polymer film. Undue stress on the braid results in breakage, typically near the ends of the fiber membranes, where they are potted in headers; and undue stress on the polymer film diminishes its adherence and increases its susceptibility to peeling from, or sloughing off the surface of the braid.

Though a "shrink test" is commonly conducted on yarns by heat shrinking in water at 98° C. via a Texurmat boil off; or, in dry air at 177° C. with 0.045 gf/dtex tension for 2 min (DuPont); or, in dry air at 190° C. with 0.135 gf/d for 30 sec (Monsanto), to date there has been no reason to heat pre-shrink any tubular braid of synthetic resin, prior to its being coated with polymer for the stated purpose of this invention, namely to make outside-in hollow fiber microfiltration and ultrafiltration asymmetric membranes. More particularly, since a braid woven with glass fiber is essentially non-heat-shrinkable, there has been no reason to provide a stable length of a polyester or nylon tubular braid by pre-shrinking it so that its shrunk length is about 84% of its pre-shrunk length at the same time ensuring that the braid retains at least 95% of its tensile strength.

Heat-shrinking in dry air, referred to as Testrite tests, of polyester and polyamide tubular braids to obtain most preferably from about 16% to 18% shrinkage, may be acheived in an electric furnace at 232° C. for 29 sec.

The denier of the yarn and structural characteristics of the braid determine the liquid and gas permeability. The liquid permeability of the braid is at least one order of magnitude (that is, more than 10 times) greater than the permeability of the polymer film. Thus the weave of the braid is so open that it presents an insubstantial barrier to gas flow.

Permeability to air of preferred polyester ("PE") and nylon ("NY") braids, determined by ASTM Standard "Air Permeability of Textile Fabrics D 737-96" are measured for a differential pressure of 1.38 kPa (0.2 psi). These are listed in the following Table 1 under "@0.2 kPa". Also listed are permeabilities "@0.02 kPa" (0.029 psi) which are obtained by extrapolation of the data curve obtained with measurements at 0.2 kPa, in the appropriate range:

TABLE 1

| Sample | I.D. mm | O.D. mm | length mm | area $cm^2$ | flowrate cc/sec | permeability $cc/sec/cm^2$ @ 1.38 kPa | @ 0.2 kPa |
|---|---|---|---|---|---|---|---|
| PE-1 | 0.76 | 1.55 | 30 | 1.461 | 10.36 | 7.09 | 1.03 |
| PE-2 | 1.02 | 1.89 | 28 | 1.663 | 7.05 | 4.24 | 0.62 |
| PE-3 | 1.13 | 2.04 | 26 | 1.666 | 5.00 | 3.0 | 0.44 |
| PE-4 | 0.76 | 1.89 | 25 | 1.484 | 1.52 | 1.02 | 0.17 |
| NY-1 | 1.00 | 2.10 | 27 | 1.781 | 3.94 | 2.21 | 0.32 |

TABLE 1-continued

| Sample | I.D. mm | O.D. mm | length mm | area $cm^2$ | flowrate cc/sec | permeability $cc/sec/cm^2$ @ 1.38 kPa | @ 0.2 kPa |
|---|---|---|---|---|---|---|---|
| NY-2 | 0.89 | 1.86 | 27 | 1.578 | 4.29 | 2.72 | 0.37 |
| NY-3 | 1.28 | 2.04 | 23 | 1.474 | 3.93 | 2.67 | 0.37 |

The moisture regain values for polyester braids are in the range from about 0.2% to 0.5% by wt, and for the above PE samples, are from about 0.4% to 0.5% by wt. For nylon braids moisture regain values are in the range from 4% to 7% by wt, and for the above NY samples are from about 4% to 5% by wt. The structure of the tubular braid provides an outer surface which is uniquely configured to have a membrane's polymer film adhere to the surface sufficiently so as not to be detached when the membrane is backwashed; the polymer film is held by the upper portion of the wall of the braid without having the wall embedded in the film. The degree of adherence is affected to some extent by the affinity of the chemical composition of the polymer for the material of the braid, but to a greater extent by the structure of the braid. The polymer film may be any polymer which provides a satisfactory asymmetric membrane, and may be formed from a polyester, polyamide, polyolefin, polyamine, polyurethane, polysulfone or cellulose acetate, most preferably PVDF containing calcined α-alumina as disclosed in Ser. No. 08/886,652, now U.S. Pat. No. 5,914,039, the disclosure of which is incorporated by reference thereto as if fully set forth herein.

The test of establishing whether adherence is satisfactory is determined by a Peel Test Procedure carried out on a Lloyd Instruments "Materials Tester" (LR K5 with a 50 N load cell) having a "German Wheel" (the "Tester" for brevity).

The "German Wheel" is used to execute a peel test of a coating on a flexible substrate, at 90° to the surface of the substrate. Each sample is especially prepared according to the standard being used. The German Wheel consists of a free running axle mounted wheel and a yoke which receives the wheel and connects it to the load to execute a test. The face of the wheel contains a sharp angled slot into which one end of the coated substrate is inserted and folded back against the sharp edge. This creates a mechanical lock which holds the sample tight as its length is drawn, coating side up, around the periphery of the wheel and passed through a locking clamp. The clamp site is just beyond a region where the coating tab length has been separated from the substrate. Thus the flexible substrate is clamped and the coating tab length hangs freely, in front of the clamp.

All tests are done on wet membranes, by slitting a six inch (6") wet membrane longitudinally. One and one-half inch (1.5") of membrane is peeled from the braid. A bare one inch (1") section of braid is inserted into the angle slot and the rest of the braid is bent around the wheel such that the longitudinal slot is facing toward the wheel surface. The angled slot anchors one end and the loose end is placed in the floating clamp and tightened. Any slack is removed by the sample tensioning screw.

The loose end of the peeled section of membrane is placed in the upper clamp of the Tester. Four inches of membrane are pulled off the braid at a rate of 100 mm/min. The German wheel rotates freely to keep the angle of peel constant. The material tester outputs a graph showing the amount of force required to peel the membrane off the substrate. The results of the samples are averaged together and plotted on a graph. The average maximum force of approximately the two inch section is recorded. Tensile Strength of Each Sample is conducted as follows:

The wet samples of membrane obtained from the Peel Test are placed in the clamps of the Tester. The clamps are placed one inch apart. The membrane sample is pulled apart at a rate of 100 mm/min. The average maximum force for the samples is recorded along with the standard deviation.

Cylindricity of the braid is determined by visual examination under a microscope.

The asymmetric film comprises a very thin "skin" overlying a more porous structure in which the pores are in open communication with one another. Such a membrane may be used for filtering either aqueous or non-aqueous solvents. For filtration of a solvent such as a primary or secondary alcohol, a ketone or a hydrocarbon, the polymer film is deposited from a solution of a solvent-resistant polymer such as polyacrylonitrile (PAN) or polyetherether ketone (PEEK).

Figure 2:
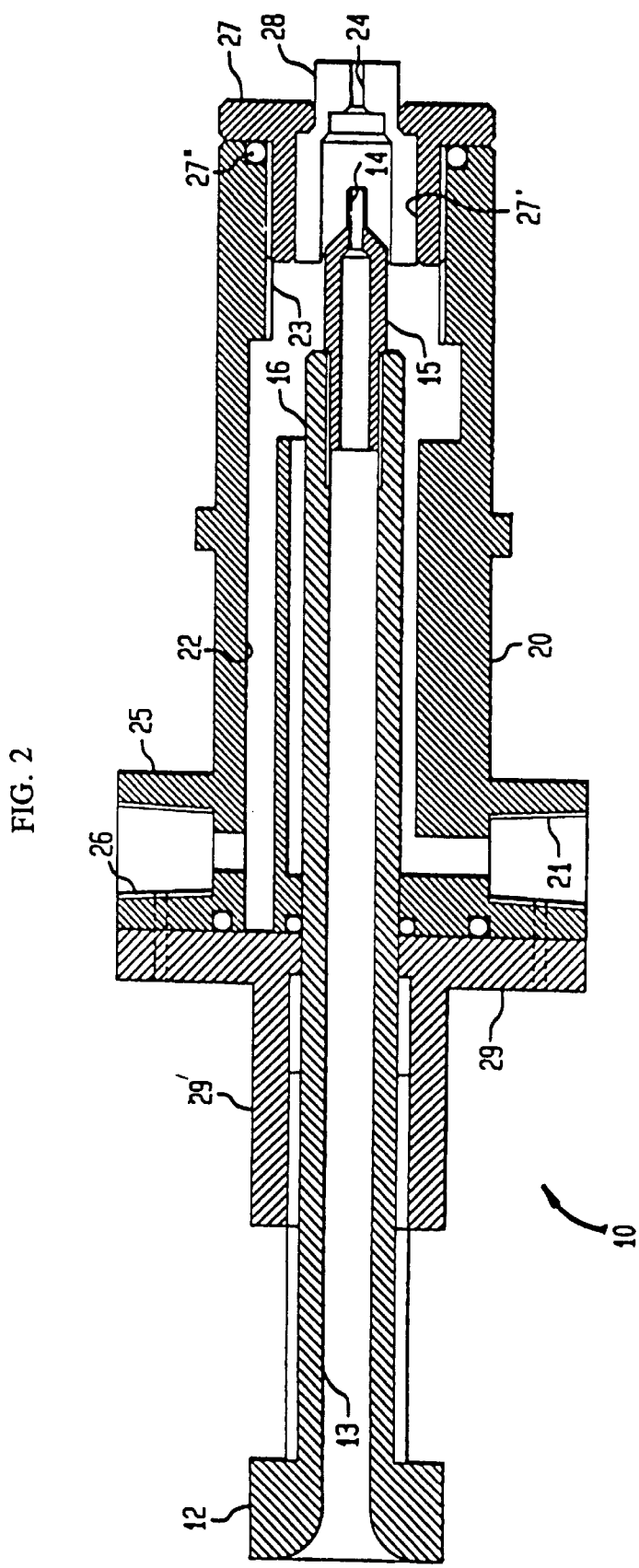
FIG. 2 is a cross-sectional elevational view along a longitudinal axis, of a coating nozzle used to form the thin non-supporting film membrane on the braid.

Referring to FIG. 2 there is shown a cross-sectional view of the coating nozzle indicated generally by reference numeral 10, which, in addition to limiting the amount of dope (polymer in solution) passing through the nozzle, meters the correct amount of dope over the surface, and distributes the metered amount uniformly over the surface of the braid (not shown) as it is drawn longitudinally axially through the nozzle.

The nozzle 10 comprises an inner barrel 12 having an internal bore 13 through which the braid is advanced into an axial bore 14 of a nipple 15 which is threadedly secured in the end 16 of the inner barrel 12. The bore 14 provides a rounding orifice to help the braid to acquire a circular cross-section before it is coated with dope. The rounding orifice 14 has a diameter in the range from about 1% to 10% less than the nominal diameter of the braid. The barrel 12 with the nipple 15 is inserted in an outer barrel member 20 having a cylindrical base 25. The outer barrel 20 is provided with a stepped inner axial chamber with a larger bore 22 and a smaller bore 23 provided with threads (not shown) near the end of the bore 23. A top-hat bushing 27 having a stepped axial bore 27' is threaded into the smaller bore 23 until it compresses an O-ring 27" in a groove between the end of the barrel 20 and the lower portion of the bushing. A sizing die 28 having a sizing orifice 24 is press-fitted in the stepped axial bore 27'. The sizing orifice ensures the circularity of the cross-section of finished hollow membrane, upon leaving the rounding orifice. As the dope-coated braid is advanced through the sizing orifice, it dresses the outside diameter of the polymer-coated surface to provide the dope with a desired wall thickness, which upon being coagulated, yields a thin film membrane which is no more than 0.1 mm thick.

The base 25 is provided with a lower port 21 and an upper port 26 each in open communication with the stepped bores 22 and 23, so that dope introduced into the port 21 can flow into the reservoir formed around the inner barrel 12, by the stepped bores 22 and 23, and travel longitudinally axially in the direction in which the braid is drawn through the larger bore 22, and the smaller bore 23 displacing air as the reservoir fills. When the dope having filled the reservoir flows out of the top port 26, it is plugged. The base 25 is removably secured with through-bolts (not shown) through the base 25 to a radially extending mounting flange 29 having a longitudinal body portion 29'. The body portion 29' is provided with an internally threaded axial bore so that the body portion 29' can be secured coaxially in position, aligning the rounding orifice 14 and the sizing orifice 24. By increasing or decreasing the number of turns of the body portion 29' the distance between the mouth of the orifice 14 and the orifice 24 can be varied. This distance is adjusted, depending upon the rate at which the braid is pulled through, the viscosity of the dope, and the thickness of the film of dope to be coated on the braid before it is immersed in the coagulant. In all cases, the distance is adjusted by trial and error, to provide a film of dope on the circumferential outer surface of the braid only sufficient to coat the braid superficially, and not enough to embed the braid in the film.

To draw the braid through the orifice 24, a longitudinal tension is maintained on the braid of at least 1 Newton but not enough to distort the voids in the braid so badly that they cannot return to an equilibrium state as they are being coated with dope. Because the braid is not embedded in the viscous polymer solution, only the outer surface of the braid is contacted with the dope so as to provide the braid with a dope- and polymer-coated outer surface.

It will now be evident that the coating nozzle 10 is a special-purpose nozzle specifically designed to provide a predetermined distance between the rounding orifice 14 and the sizing orifice 24 while a dope coated braid no larger than about 2.5 mm (nominal o.d.) is advanced through both orifices sequentially. The amount of dope metered into the coating nozzle and the rate at which the braid is advanced through the rounding orifice are determined by trial and error such as one skilled in this art is accustomed to engage in under comparable circumstances.

After the dope-coated braid leaves the sizing orifice, it is led into a coagulating bath, typically under and over a series of rolls, so that the liquid coagulant held in the bath contacts the entire circumferential surface of the coated braid. Because the polymer is insoluble in the coagulant it does not penetrate the thin film formed and enter the lumen. Upon contacting the coagulant, the dope coagulates, yielding the desired thin film membrane. The bore of the fiber contains air at atmospheric pressure.

Figure 3:
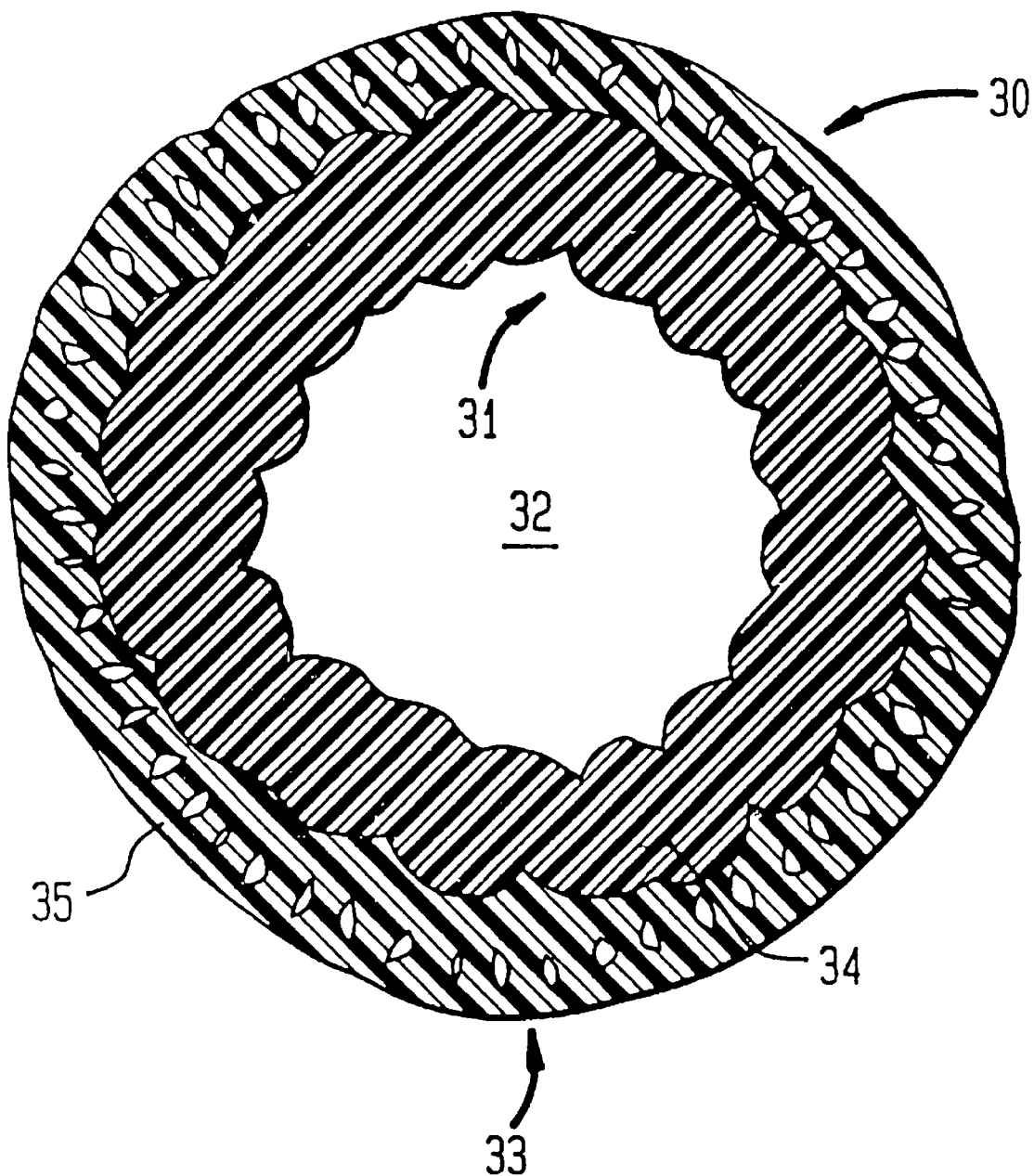
FIG. 3 is a cross-sectional end view of a hollow fiber membrane of this invention schematically illustrating the radially disposed annular zones which extend longitudinally axially over the length of the membrane, and showing how the tubular non-self-supporting film is supported on the braid without being embedded therein.

Referring to FIG. 3 there is shown in a diametrical cross-sectional view, much enlarged, a tubular braid indicated generally by reference numeral 30 comprising a braid of woven yarn 31 having a "lumen" (inner bore) 32. A thin film membrane, indicated generally by reference numeral 33, is self-adherently secured to the circumferential outer surface 34 which is rough and uneven because it is formed by the interwoven yarn which, in the range of thickness used and the number of picks in which it is woven, does not result in an even surface. The essential characteristic of the thin film membrane 33 is that it is supported superficially, on the circumferential surface of the tubular braid without the braid becoming embedded in the thin film. This characteristic is evident in a photomicrograph which clearly illustrates that the circumferential inner surface of the tubular braid's bore 32 is essentially free of polymer.

Figure 4:
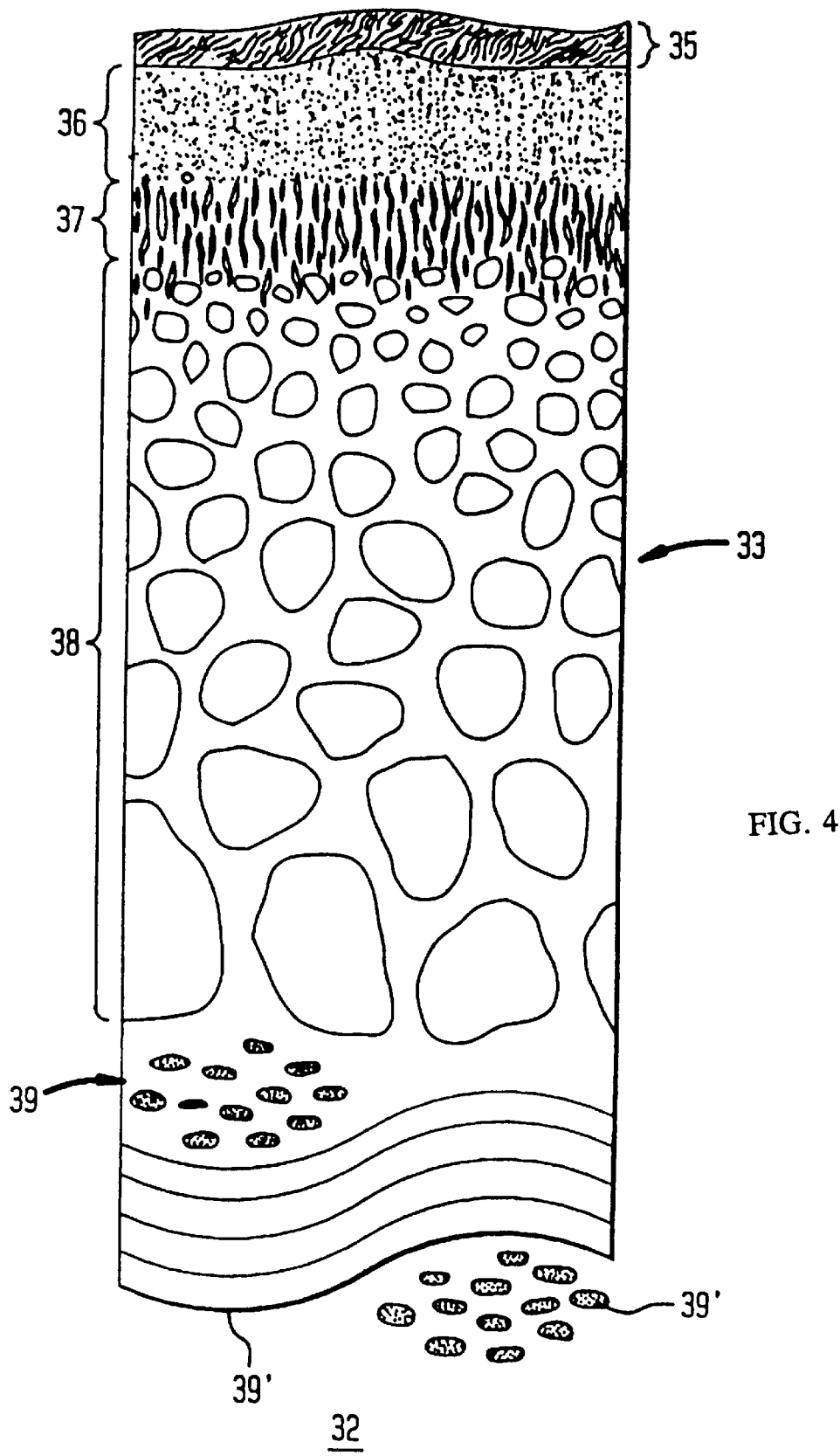
FIG. 4 is a cross-sectional view with greatly enlarged dimensions, to illustrate the dimensional relationships of pores in the component layers of the braid-supported membrane which pores make the membrane so effective, particularly for microfiltration and ultrafiltration.

Referring to FIG. 4 there is schematically illustrated, more greatly enlarged than in FIG. 3, the asymmetric thin film membrane 33, which when formed by being coagulated, is itself striated into an overlying ultrathin barrier layer or "skin" 35 and three distinctly identifiable layers of pores, an outer layer 36, an inner layer 38 and an intermediate transport layer 37 between outer layer 36 and inner layer 38, as schematically illustrated in greater detail in FIG. 4. The skin is a very thin dense layer of polymer formed as the dope contacts the coagulant. By reason of the manner in which the skin and each layer is formed from the same polymer, the layers have, in a radially inward direction from under the skin to the braided yarn 39 which defines the bore 32, progressively larger pores. As shown in FIG. 4, each "end" 39 or yarn consists of a multiplicity of filaments 39', and the circumferential surface of the interwoven strands of yarn does not provide a smoothly cylindrical surface. The skin is generally thinner and the pores for a MF membrane are larger than those of a UF membrane made from is the same polymer. The measured skin thickness (by electron microscopy) for particular films made for the braided membrane, is given below to appreciate its thickness in relation to the pores of the layers. The approximate ranges of sizes of the pores for preferred MF and UF membranes are given below:

TABLE 2

|  | MF, $\mu$m | UF, $\mu$m |
|---|---|---|
| Skin 35, thickness | 0.1–1.5 | 1–4 |
| Outer layer 36, avg pore diam | 0.5–1.0 | 0.5–2 |
| Intermediate transport layer 37* | 2–6 | 5–10 |
| Inner layer 38, avg pore diam | 10–40 | 10–150 |

*average pore diameter

In membranes, in general, the thickness of the skin is small relative to the thickness of the layers. The skin is thicker in a UF membrane than in a MF membrane, and it would be even thicker in a RO membrane (not measured). Though FIG. 4 is not to scale, by reason of the manner in which the membrane is formed, the thickness of the outer layer is generally smaller than that of the transport layer, which in turn, is not as thick as the inner layer.

The approximate thickness of each layer in a MF and UF braided membrane are given in the following Table 3.

TABLE 3

| Thickness, average | MF, $\mu$m | UF, $\mu$m |
|---|---|---|
| Skin 35, | 0.1–1.5 | 1–4 |
| Outer layer 36 | 5–10 | 20–40 |
| Intermediate transport layer 37 | 30–50 | 40–80 |
| Inner layer 38 | 100–1000 | 100–1000 |

The following examples illustrate the invention, but should not be construed as limiting the invention which is defined in the appended claims.

EXAMPLE 1

Coating braids with different properties with the same dope:

In the following examples two tubular braids A and B, made from yarns of nylon 6/6 fibers, and upon initial examination having properties which are essentially the same except for the denier of the filament, are each coated with a dope of poly(vinylidenefluoride) (PVDF) in N-methyl-2-pyrrolidone (NMP), containing a polyhydroxy alcohol hydrophilic additive and having a viscosity of 38,000 cps. The rate of flow of solution to the nozzle is adjusted so that the solution is flowed upon and around the periphery of the braid over a coating distance of 3 mm (0.125 inch). The braid, coated with the solution is then pulled through a sizing die having a diameter of 2.5 mm, then led into a coagulation tank where the polymer solution is coagulated in water to afford a semi-permeable membrane about 0.06 mm thick, supported on the tubular braid which assumes an essentially circular cross-section. It is then pulled through a glycerine bath, dried and taken up onto the reel of a winder. The coating conditions for each braid are the same, namely:

| Bath Temperature | 46° C. (115° F.) |
|---|---|
| WUS* | 12.19 meters/min (40 ft/min) |

The braids differed as follows:

|  | Braid A | Braid B |
|---|---|---|
| Yarn Denier | 315 | 420 |
| Filaments | 68 | 68 |
| Denier/filament | 4.6 | 6.2 |
| Ends | 1 | 1 |
| Picks | 44 | 44 |
| Cylindricity | 0.9 | 0.9 |
| Mean outside diam. | 1.88 mm | 2.01 mm |
| Mean inside diam. | 0.86 mm | 1.06 mm |
| Shrinkage | 3.4% | 3.4% |
| Breaking strength, lb-f | 5.93 | 7.68 |
| Button** | 2.15 mm | 2.53 mm |

**the inside diameter of a finishing die through which the coated braid is passed.

Upon being tested for filtration, coated Braid B provided a permeability twice that of coated Braid A Upon examination of the coated braids, it is found that Braid A, made with lower denier yarn, gave a "looser" braid which allowed the dope to penetrate to the inner wall of the braid, embedding it, and leaving little on the outer surface, as is evident from the following:

|  | Braid A | Braid B |
|---|---|---|
| Coated mean outr diam. | 1.89 mm | 2.15 mm |
| Thickness of coating | 0.005 mm | 0.070 mm |
| Mean wall thickness | 0.520 mm | 0.475 mm |
| Flux @ 15 psi | 171.9 usgfd | 383 usgfd |

A photograph of a cross-section of the braided MF membrane, made with an electron microscope, shows the film membrane overlying the braid to be about 0.05 mm thick and the braid is not embedded in the film. The thickness of the skin 35, and each individual layer 36–38 will depend upon the conditions under which the film is made. Measurements made in a vertical plane through the circumference, across the wall of the film, provides the following data on pore sizes:

| Section | $\mu$m |
|---|---|
| Skin thickness | 0.8 |
| Outer layer 36* | 0.781 |
| Intermediate layer 37* | 3.9 |
| Inner layer 38* | 14–32 |

*average pore size

The braided membrane was used to form a MF filtration module having a construction described in U.S. Pat. No. 5,783,083 to Mahendran et al. The water permeability measured under 67 kPa (5 psi suction pressure) and 22° C. is found to be 170 LMH (100 USgfd).

EXAMPLE 2

Comparison of braids made with polyester and glass fiber yarns and an "ADC" membrane:

A dope, code ADC, is made up similar to the PVDF-in-NMP solution used in Example 1 hereabove, with 16 parts PVDF; 81 parts NMP; 2 parts HPVA; and 1 part LiCl; having a viscosity of 56,000 cps, and is fed to a nozzle through which tubular braids of glass fiber and polyester are advanced to prepare fibers which are substanitally identical except for the material of the yarn from which the braids are made. As before, the of flow of dope adjusted so that the solution is flowed upon and around the periphery of each braid over a coating distance of 3 mm (0.125 inch), pulled through the same sizing die, coagulated in water to afford a thin semipermeable membrane 0.05 mm thick, supported on the braid, then pulled through a glycerine bath. Each braided MF membrane has an o.d. of about 1.88–1.92 mm, and cylindricity of about 0.9, the i.d. of each being about 0.9 mm. Each coated braid is taken up onto the reel of a winder and used to make skeins.

The skeins, each having an area of 130 ft$^2$ are placed in MF service in a reservoir of water contaminated with leachate from a land-fill site. The COD of the leachate is in the range from 1000 to 1500 mg/L. Air in an amount in the range from 400 to 450 m$^3$/hr is provided at the base of each skein. After six months service under usual operating conditions and identical back-flushing procedures, it was found that every skein made with glass fiber braid had suffered from 2 to 20 broken fibers.

When skeins made with fibers of polyester braid are placed in the same service as the fibers of glass fiber braid above, under identical operating conditions and the same back-flushing procedures, it was found that after six months service, not a single fiber of polyester braid was broken.

EXAMPLE 3

A dope is made up similar to the PVDF-in-NMP solution used in Example 1 hereabove, except that it is made up with the following components in the relative amounts (parts by weight) set forth: N-methyl-2-pyrrolidone (NMP) 82; polyvinylidene fluoride (PVDF) 15; calcined α-alumina particles ("α-Al") 2; 50% hydrolyzed polyvinyl acetate (HPVA) 1; for a total of 100 parts. 70 g of calcined α-Al particles having an average primary particle size of about 0.4 μm are weighted in a flask to which 2787 g of NMP is added and thoroughly mixed in a Sonicator® for at least 1.5 hr, to ensure that agglomerates of primary particles are broken up so as to form a suspension in which individual primary particles are maintained in spaced apart relationship with each other in the NMP. The suspension is milky white, the white color being contributed by the white calcined α-Al. To this suspension is slowly added 525 g of PVDF having a number average mol wt of about 30,000 Daltons while stirring at high speed until addition of the PVDF is complete. During the addition of the PVDF the milky white color of the suspension changes first to pink, then to yellowish brown, at the end to grey/brown. Since PVDF dissolved in NMP produces no color change, and the milky white color of the suspension is attributable to the α-Al particles, the changes in color provide evidence of a reaction between the calcined α-Al or a base present in the calcined alumina.

When the grey/brown color of the NMP/PVDF/α-Al complex in suspension is stable and does not change upon standing for a sustained period in the range from 4 hr to 24 hr, 118 g of a 30% solution of 50% HPVA containing 1.6–1.7% sulfuric acid in NMP is added to form a dope which is stirred overnight. The dope is then degassed either by letting it stand for 24 hr, or by centrifuging it. The viscosity of the degassed dope is about 14,500 centipoise (cp).

The dope formed is fed to a nozzle through which Braid B used in Example 1 above is advanced at about 12.2 meters/min (40 ft/min), and coated at a pressure of 274 kPa (25 psig) over a coating distance of 3 mm (0.125 inch). The coated braid is sized in a sizing die having a diameter of 2.55 mm, then led into a coagulation tank where the polymer solution is coagulated in water to afford a semipermeable membrane about 0.13 mm thick, supported on the tubular braid which has a cylindricity of about 0.9. This coated braid was then quenched by immersion in sequential first and second coagulation baths of water, each at 47° C. (116° F.), and finally through a glycerine bath before it is taken up onto the reel of a winder. In tests, it is found that the braided MF membrane provides excellent results.

After a section of the braided membrane was washed overnight in cold water, its water permeability is determined by measuring its flux which is found to be 6 LMH/kPa or, permeability of 25 GFD/psi measured at 5 psi. After another section of the braided membrane, it is treated with an aqueous solution containing 2000 ppm of sodium hypochlorite (NaOCl). Water permeability of the NaOCl-treated membrane was found to be 12 LMH/kPa measured at 35 kPa (50 GFD/psi measured at 5 psi). In each case, the pore size measurements and molecular weight cut-off measurements provide evidence that the pores in the film are suitable for microfiltration.

We claim:

1. An outside-in hollow fiber asymmetric membrane comprising a flexible macroporous tubular braid support having a tubular film of synthetic resinous material supported on the outer circumferential surface of the braid without the support being embedded in the film which has a wall thickness of less than 0.2 mm, the braid comprising, from about 16 to 60 separate yarns, each on its own carrier, each yarn using multifilament 150 to 500 denier (gm/9000 meters) yarn, each multifilament being made with from 25 to 750 filaments, each filament being from 0.5 to 7 denier, the braid being woven with from 1 to 3 multifilament ends at from 30 to 45 picks (crosses/inch), with a wall thickness in the range from about 0.2 mm but less than three times the diameter of the yarn from which said braid is woven, the braid having a stable heat-pre-shrunk length which is in the range from about 1% to 20% less than its unshrunk length, an air permeability in the range from about 1 to about 10 cc/sec/cm$^2$ at 1.378 kPa, and extension at break of the pre-shrunk braid is at least 10%, such that the membrane is adapted for use as a microfiltration or ultrafiltration liquid separation membrane.

2. The asymmetric membrane of claim 1 wherein said ends are non-plied in each said yarn but lie linearly adjacent each other until taken up to form said braid which is pre-shrunk to a length in the range from about 1% to 8% less than its unshrunk length.

3. The asymmetric membrane of claim 1 wherein the tubular braid support has a cylindricity greater than 0.8 and a maximum extension at break of at least 10%.

4. The asymmetric membrane of claim 3 wherein the tubular braid support has a wall thickness in the range from about 0.2 mm to less than three times the diameter of said yarn, and a maximum extension at break of at least 20%.

5. The asymmetric membrane of claim 3 wherein the tubular braid support has separate yarns woven in a pattern chosen from Regular, Diamond and Hercules.

6. In an outside-in hollow fiber asymmetric semipermeable membrane comprising,
  (i) a macroporous foraminous tubular support means having an outer surface; and,
  (ii) a polymeric film of a reaction product of (a) a complex of polyvinylidene difluoride (PVDF) with calcined α-alumina particles, and (b) a hydrophilic polymer adapted to impart hydrophilicity to said membrane;
  said particles having a primary particle size in the range from about 0.1 μm to 5 μm being present in an amount at least 1 percent by weight, but less than 50 percent by weight, of said film;
  said film being supported by said outer surface, and said film having a peripheral barrier layer or "skin" integral with successive microporous layers having pores having an average diameter in the range from about 0.01 μm to about 0.3 μm, in open communication with each other,
  the improvement comprising,
    a flexible macroporous tubular braid support comprising from about 16 to 60 separate yarns, each on its own carrier, each yarn using multifilament 150 to 500 denier (gm/9000 meters) yarn, each multifilament being made with from 25 to 750 filaments, each filament being from 0.5 to 7 denier, said braid being woven with from 1 to 3 multifilament ends at from 30 to 45 picks (crosses/inch), and said braid has a wall thickness in the range from about 0.2 mm but less than three times the diameter of the yarn from which said braid is woven, has a stable heat-pre-shrunk length which is in the range from about 1% to 20% less than its unshrunk length, and an air permeability in the range from about 2.67 to about 7.09 cc/sec/cm² at 1.378 kPa,
  whereby said membrane is adapted for use as a microfiltration or ultrafiltration liquid separation membrane.

7. The hollow fiber of claim 6 wherein said macroporous foraminous tubular support means support means has a stable heat-pre-shrunk length which is in the range from about 1% to 20% less than its unshrunk length and an air permeability less than 10 cc/sec/cm² at 1.378 kPa.

8. The hollow fiber of claim 7 wherein said filaments are formed from a synthetic resin selected from the group consisting of polyester and polyamide.

9. The hollow fiber of claim 8 wherein said braid has an inside diameter more than 0.5 mm, an outside diameter less than 3 mm and a wall thickness in the range from about 0.2 mm to about 1.0 mm.

10. The tubular braid support of claim 9 wherein said separate yarns are woven in a pattern chosen from Regular, Diamond and Hercules.

11. The hollow fiber of claim 7 wherein said braid, stretched longitudinally, has an extension at break in the range from 10% to 30%.

* * * * *